US012086956B2

(12) United States Patent
Pham et al.

(10) Patent No.: US 12,086,956 B2
(45) Date of Patent: Sep. 10, 2024

(54) DEVICE BASED ON MACHINE LEARNING

(71) Applicant: VINAI ARTIFICIAL INTELLIGENCE APPLICATION AND RESEARCH JOINT STOCK COMPANY, Ha Noi (VN)

(72) Inventors: Cuong Cao Pham, Ha Noi (VN); Tu Van Pham, Ha Noi (VN); Dung Tri Nguyen, Ha Noi (VN)

(73) Assignee: VINAI AI APPLICATION AND RESEARCH JOINT STOCK CO., Ha Noi (VN)

( * ) Notice: Subject to any disclaimer, the term of this patent is extended or adjusted under 35 U.S.C. 154(b) by 396 days.

(21) Appl. No.: 17/667,688

(22) Filed: Feb. 9, 2022

(65) Prior Publication Data

US 2022/0270225 A1    Aug. 25, 2022

(30) Foreign Application Priority Data

Feb. 9, 2021   (VN) .............................. 1-2021-00761

(51) Int. Cl.
  *G06T 5/50*   (2006.01)
  *G06T 3/18*   (2024.01)
  *G06T 3/4046*   (2024.01)
  *G06T 5/70*   (2024.01)
  *G06T 5/73*   (2024.01)
  (Continued)

(52) U.S. Cl.
  CPC .................. *G06T 5/50* (2013.01); *G06T 3/18* (2024.01); *G06T 3/4046* (2013.01); *G06T 5/70* (2024.01); *G06T 5/73* (2024.01); *G06T 7/30* (2017.01); *G06T 7/90* (2017.01); *G06T 2207/10024* (2013.01); *G06T 2207/10144* (2013.01); *G06T 2207/20081* (2013.01); *G06T 2207/20084* (2013.01); *G06T 2207/30196* (2013.01)

(58) Field of Classification Search
  CPC ........... G06T 5/50; G06T 3/18; G06T 3/4046; G06T 5/70; G06T 5/73; G06T 7/30; G06T 7/90; G06T 2207/10024; G06T 2207/10144; G06T 2207/20081; G06T 2207/20084; G06T 2207/30196; G06T 5/60
  See application file for complete search history.

(56) References Cited

U.S. PATENT DOCUMENTS 2,960,566 A * 11/1960 Athey .................. H04N 7/0107
                                                                                             348/E7.01
6,268,847 B1 * 7/2001 Glen ...................... H04N 9/641
                                                                                                 345/604
(Continued)

*Primary Examiner* — Charles T Shedrick
(74) *Attorney, Agent, or Firm* — United One Law Group LLC; Kongsik Kim; Jhongwoo Peck

(57) ABSTRACT

An image processing device includes a convolutional neural network (CNN) architecture configured to perform at least one of denoising, deblurring, dehazing, and color correction on an input. The input comprises a plurality of low-quality input images having different exposure values captured for the same object at the same time by a camera under display (CUD) to render a high-quality output image. The CNN architecture is trained using a set of training images including a plurality of low-quality training images having different exposure values and a high-quality training image corresponding to the plurality of low-quality training images.

7 Claims, 4 Drawing Sheets

(51) Int. Cl.
    *G06T 7/30*    (2017.01)
    *G06T 7/90*    (2017.01)

(56) References Cited

U.S. PATENT DOCUMENTS

| | | | |
|---|---|---|---|
| 11,368,617 B2* | 6/2022 | Zhou | G06V 10/764 |
| 2022/0067889 A1* | 3/2022 | Kang | G06T 5/73 |
| 2022/0138924 A1* | 5/2022 | Kwon | G06T 5/73 |
| | | | 382/275 |
| 2022/0182537 A1* | 6/2022 | Kim | G06T 5/73 |
| 2022/0270225 A1* | 8/2022 | Pham | G06T 5/73 |
| 2022/0318971 A1* | 10/2022 | Choi | G06T 5/50 |
| 2022/0398698 A1* | 12/2022 | Li | G06N 3/09 |
| 2023/0071693 A1* | 3/2023 | Kang | G06T 5/70 |
| 2024/0135673 A1* | 4/2024 | Xu | G06T 5/73 |

* cited by examiner

DEVICE BASED ON MACHINE LEARNING

CROSS-REFERENCE TO RELATED APPLICATION

This application claims priority from Vietnamese Application No. 1-2021-00761 filed on Feb. 9, 2021, which application is incorporated herein by reference in its entirety.

BACKGROUND

1. Technical Field

The present invention relates to an image processing device based on machine learning.

2. Description of Related Art

The design of selfie smartphone camera has undergone a dramatic and fundamental shift in the quest for full-screen display. This ever-evolving trend has brought us wide notch, water-drop notch, punch-holes, or even pop-up cameras. These are the most popular front camera location, but not elegant designs. In order to remove the bezel and offer full-screen display, smartphone manufactures tend to position the selfie camera under the display at the expense of image quality.

When the camera is located under the screen, the light transmission rate is much lower than other conventional designs. This limits the camera's ability to capture light, especially in low light, resulting in large color variations and reduced detail in the captured image compared to the actual scene. In addition, the reflection in the screen layers results in optical errors, causing flare and haze in the captured image. Producing high-quality photos and videos under these difficult conditions is a major challenge for all major smartphone manufactures.

We tackle these aforementioned limitations by developing our CUD (camera under display) solution that enables smartphones with under-display camera to capture high-quality selfie photos, e.g. the image quality should match the quality of more typical front-facing cameras.

Non Patent Literature 1: Yuqian Zhou, David Ren, Neil Emerton, Sehoon Lim, Timothy Large, "Image Restoration for Under-Display Camera", https://arxiv.org/abs/2003.04857.

Non Patent Literature 2: Olaf Ronneberger, Philipp Fischer & Thomas Brox, "U-Net: Convolutional Networks for Biomedical Image Segmentation". Medical Image Computing and Computer-Assisted Intervention (MICCAI), Springer, LNCS, Vol. 9351, 234-241, 2015. https://arxiv.org/abs/1505.04597.

Non Patent Literature 3: Jie Hu, Li Shen, Samuel Albanie, Gang Sun, Enhua Wu, "Squeeze-and-Excitation Networks", CVPR, 2018. https://arxiv.org/abs/1709.01507.

SUMMARY

The present invention provides an image processing device based on a deep neural design architecture capable of improving the quality of images captured using a camera under display (CUD).

The problem to be solved in the embodiment is not limited thereto, and the objectives and effects that may be grasped from the solutions or embodiments of the problems described below are included.

The image processing device according to an embodiment of the present invention may include a convolutional neural network (CNN) architecture configured to perform at least one of denoising, deblurring, dehazing, and color correction on an input, wherein the input comprises a plurality of low-quality input images having different exposure values captured for the same object at the same time by a camera under display (CUD) to render a high-quality output image, wherein the CNN architecture is trained using a set of training images including a plurality of low-quality training images having different exposure values and a high-quality training image corresponding to the plurality of low-quality training images.

The plurality of low-quality training images and the high-quality training image may be images capturing the same object at the same time, the plurality of low-quality training images may be captured through a CUD to have different exposure values, and the high-quality training image may be captured through a front camera other than the CUD.

The plurality of low-quality input images and the plurality of low-quality training images may include three low-quality images having different exposure values.

The CNN architecture may include nine input channels and three output channels.

The CNN architecture may receive information on RED color channels, GREEN color channels, and BLUE color channels of the respective three low-quality images through the nine input channels.

The CNN architecture may output information on the RED color channel, the GREEN color channel, and the BLUE color channel through the three output channels.

The CNN architecture may learn by matching the information on the RED color channel, the GREEN color channel, and the BLUE color channel of the output channels to information on the RED color channel, the GREEN color channel, and the BLUE color channel of the high-quality training image, respectively.

The CNN architecture may be trained using training data, wherein the training data comprises three patch images generated for the three low-quality training images by estimating overlapped regions of interest that overlap each of the three low-quality training images and the warped high-quality training image, and a fourth patch image that is best aligned to the three patch images on the regions of interest of the warped high-quality training image, wherein the warped high-quality training image is formed by applying a warping transform on the high-quality training image using a homography matrix, and wherein the homography matrix is estimated using the three low-quality training images and the high-quality training image.

The four patch images may be determined to be aligned if the first similarity score between the first patch image and the fourth patch image, the second similarity score between the second patch image and the fourth patch image, the third similarity score between the third patch image and the fourth patch image are larger than a predetermined threshold value.

The CNN architecture may be a modified U-NET, wherein the modified U-NET includes a contraction path for down-sampling input data, and an expansion path for up-sampling the down-sampled data and wherein the modified U-NET size is reduced by reducing the number of feature maps, the modified U-NET is further provided with a LeakyReLU layer in replacement of ReLU layer, and a SEBlock layer is added to the modified U-NET.

The contraction path may include a first layer combination in which a convolutional layer, a leaky ReLU layer, a SEBlock layer, and a pooling layer are sequentially arranged.

The expansion path may include a second layer combination in which an up-sampling layer, a convolutional layer, a leaky ReLU layer, and a SEBlock layer are sequentially arranged.

The CNN architecture may further include a conversion unit for converting a YUV color format of the low-quality images to a RGB color format or converting the RGB color format of the output image to the YUV color format.

The image processing device may further include an image enhancer wherein the image enhancer is configured to extract human area in the high-quality training image and apply color adjustment to the extracted human area to enhance the quality of high-quality training image.

According to the embodiment, there is an advantage of improving low-quality images captured by the CUD.

Various and beneficial advantages and effects of the present invention are not limited to the above description, and will be more easily understood in the course of describing specific embodiments of the present invention.

BRIEF DESCRIPTION OF THE DRAWINGS

The above and other objects, features and advantages of the present disclosure will become more apparent to those of ordinary skill in the art by describing exemplary embodiments thereof in detail with reference to the attached drawings, in which.

DETAILED DESCRIPTION

Figure 1:
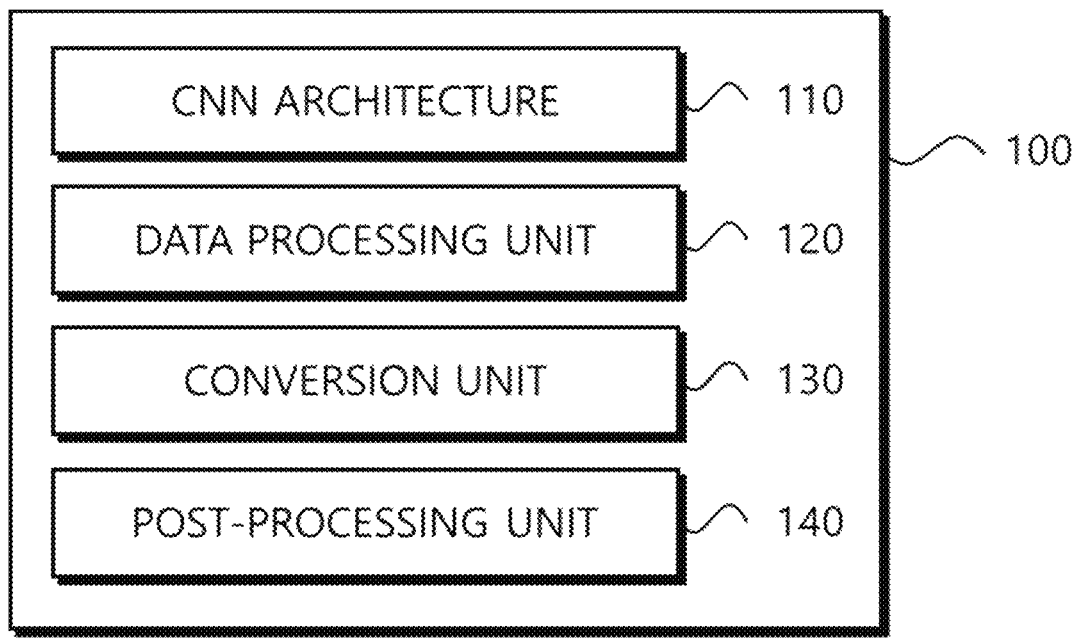
FIG. 1 is a block diagram of an image processing device according to an embodiment of the present invention.

While the present invention may have various modifications and alternative forms, specific embodiments thereof are shown by way of example in the drawings and will be described herein in detail. However, there is no intent to limit the present invention to the particular forms disclosed. On the contrary, the present invention is to cover all modifications, equivalents, and alternatives falling within the spirit and scope of the appended claims.

It should be understood that, although the terms "first," "second," and the like may be used herein to describe various elements, the elements are not limited by the terms. The terms are only used to distinguish one element from another element. For example, a first element could be termed a second element, and, similarly, a second element could be termed a first element without departing from the scope of the present invention. As used herein, the term "and/or" includes any and all combinations of one or more of the associated listed items.

It should be understood that when an element is referred to as being "connected" or "coupled" to another element, the element may be directly connected or coupled to another element or intervening elements may be present. In contrast, when an element is referred to as being "directly connected" or "directly coupled" to another element, there are no intervening elements present.

The terminology used herein is for the purpose of describing particular embodiments only and is not intended to be limiting to the present invention. As used herein, the singular forms "a," "an," and "the" are intended to also include the plural forms, unless the context clearly indicates otherwise. It should be further understood that the terms "comprise," "comprising," "include," and/or "including," when used herein, specify the presence of stated features, integers, steps, operations, elements, parts, or combinations thereof, but do not preclude the presence or addition of one or more other features, integers, steps, operations, elements, parts, or combinations thereof.

Unless otherwise defined, all terms including technical and scientific terms used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments will be described in detail with reference to the accompanying drawings, the same or corresponding components are denoted by the same reference numerals regardless of reference numbers, and thus the description thereof will not be repeated.

FIG. 1 is a block diagram of an image processing device according to an embodiment of the present invention.

Referring to FIG. 1, the image processing device according to the embodiment of the present invention may include a CNN architecture.

Referring also to FIG. 1, the image processing device 100 according to the embodiment of the present invention may include a CNN architecture 110, a data processing unit 120, a conversion unit 130, and a post-processing unit 140.

The CNN architecture 110 performs at least one of denoising, deblurring, dehazing, and color correction on an input comprising a plurality of low-quality input images captured for the same object at the same time by a camera under display (CUD), to render a high-quality output image.

The CUD means a camera placed under a display. For example, the CUD may be installed on the lower portion of the liquid crystal of a smartphone, and may receive light through a transparent material constituting the liquid crystal. In such a CUD, the amount of light reaching a sensor through the display is inadequate, resulting in a problem of lowering the level of image quality.

The plurality of low-quality input images may be three low-quality images having different exposure values. The exposure value may mean the amount of light entering the sensor. The exposure value may be set differently by controlling the shutter speed and the aperture value. The three low-quality input images with three different exposure values may be captured almost synchronously. An image with a smaller exposure value reduces flare and preserves more detailed information, while an image with a larger exposure value has an advantage of providing a better color image. The combination of the three low-quality input images may be compensate each other to render a high-quality output image.

The CNN architecture 110 may include nine input channels of the respective three low-quality input images and three output channels of the respective high-quality output image.

The CNN architecture 110 may receive information on RED color channels, GREEN color channels, and BLUE color channels of the respective three low-quality input images through the nine input channels. For example, the CNN architecture 110 may receive information on the RED color channel, the GREEN color channel, and the BLUE color channel of the first low-quality input image, information on the RED color channel, the GREEN color channel and the BLUE color channel of the second low-quality input image, and information on the RED color channel, the GREEN color channel, and the BLUE color channel of the third low-quality input image.

The CNN architecture 110 may output information on the RED color channel, the GREEN color channel, and the BLUE color channel of the respective high-quality output image through the three output channels.

In addition, the CNN architecture 110 may perform various image processing techniques capable of improving image quality on the output image.

The CNN architecture 110 may be trained using a set of training images including a plurality of low-quality training images having different exposure values and one high-quality training image corresponding to the low-quality training images.

The data processing unit 120 generates a set of training images used for training the CNN architecture 110. The data processing unit 120 may generate one set of training data through one high-quality training image corresponding to the plurality of low-quality training images.

The conversion unit 130 may convert a color format of an image. The conversion unit 130 may convert a YUV color format of an image into a RGB color format or convert the RGB color format into the color format.

In an embodiment, the image processing device 100 may receive the low-quality images in YUV format, while the actual format used in the CNN architecture 110 is RGB. Therefore, the conversion unit 130 may convert a YUV color format of the low-quality images to a RGB color format.

The post-processing unit 140 may post-process the rendered output image from the CNN architecture 110. According to the embodiment, the post-processing unit 140 may post-process the rendered image using an image post-processing technique capable of improving the contrast and white balance of the rendered image.

Meanwhile, the image processing device 100 of the present invention may be connected to an IT infrastructure for efficiently storing, copying, and processing large-scale data. In addition, the image processing device 100 of the present invention may be connected to an IT infrastructure that performs learning of the CNN architecture 110 to accelerate the training process.

The image processing device 100 according to the embodiment of the present invention may be implemented through a device including a CPU and a memory, and the above features may be implemented in the form of algorithms and performed through the CPU and the memory.

Figure 2:
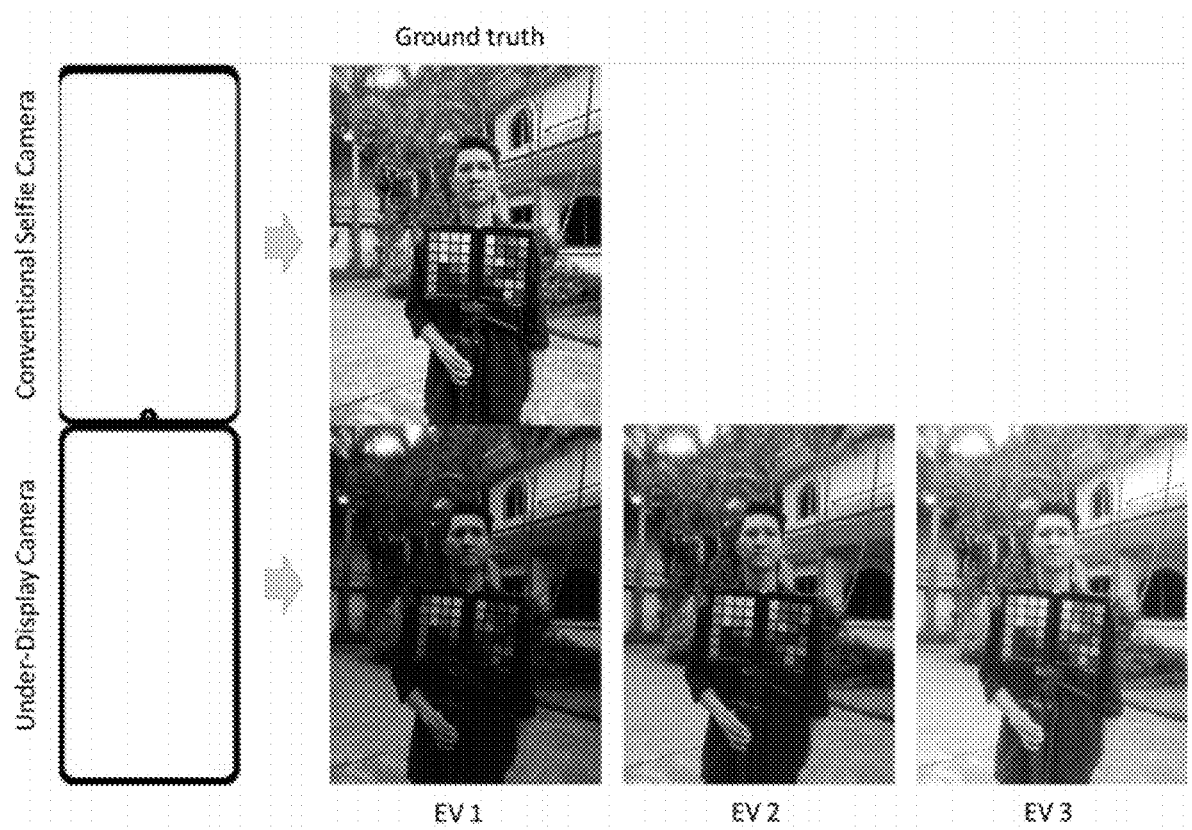
FIG. 2 is a view explaining a data processing unit according to an embodiment of the present invention.

FIG. 2 is a view explaining a data processing unit according to an embodiment of the present invention.

The data processing unit may generate training data through a plurality of low-quality training images and one high-quality training image.

First of all, the plurality of low-quality training images may be captured through a camera under display (CUD).

The plurality of low-quality training images may be three low-quality training images having different exposure values. The exposure value may mean the amount of light entering the sensor. The exposure value may be set differently by controlling the shutter speed and the aperture value. The three low-quality training images with three different exposure values may be captured almost synchronously. As shown in FIG. 2, a first low-quality training image EV1, a second low-quality training image EV2, and a third low-quality training image EV3 may be images capturing the same object at the same time. The first low-quality training image EV1 may have a smaller exposure value than the second low-quality training image, and the second low-quality training image EV2 may have a smaller exposure value than the third low-quality training image EV3. An image with a smaller exposure value reduces flare and preserves more detailed information, while an image with a larger exposure value has an advantage of providing a better color image. The present invention has an advantage of rendering high-quality output images by generating training data using a complementary relationship between exposure values.

Next, the one high-quality training image may be captured through a camera other than the CUD. For example, the camera other than a CUD may be a conventional front camera disposed in a notch of a smartphone.

The high-quality training image may mean an image in which the same object as the object captured through the plurality of low-quality training images captured at the same time. Referring to FIG. 2, it may be seen that the one high-quality training image (i.e., Ground truth) has a higher quality than the plurality of low-quality training images. This is because, unlike a CUD, a display is not disposed in front of a camera that captures the high-quality training image, so the amount of light reaching the sensor is sufficient.

The image processing device 100 may further includes an image enhancer (not shown in the Drawings) that is configured to extract human area in the high-quality training image and apply color adjustment to the extracted human area to enhance the quality of high-quality training image. The reason for the providing of the image enhancer is that even with conventional front cameras, the captured images sometime yield unexpected color shift, especially in difficult conditions such as low-light, backlit, etc. This process could guarantee the Ground truth data is of highest quality.

In order to generate the training data, the data processing unit 120 may extract aligned patch images between the three low-quality training images and the high-quality training image. First, a homography matrix is estimated using the three low-quality training images and the high-quality training image. Then, the homography matrix is used to apply a warping transform on the high-quality training image and calculate the overlapped regions of interest on the three low-quality training images that overlap between the three low-quality training images and the warped high-quality training image. In an example, three patch images are randomly sampled on the three overlapped regions of interest. Accordingly, a first patch image corresponding to the first overlapped regions of interest on the first low-quality training image that overlaps between the first low-quality training image and the warped high-quality training image, a second patch image corresponding to the second overlapped regions of interest on the second low-quality training image that overlaps between the second low-quality training image and the warped high-quality training image, and a third patch image corresponding to the third overlapped regions of interest of the third low-quality training image that overlaps between the third low-quality training image and the warped high-quality training image may be generated.

In addition, the data processing unit 120 may identify a patch image that is best aligned to the three obtained patch images on the regions of interest of the warped high-quality training image. Accordingly, a fourth patch image corresponding to the high-quality training image may be generated.

Moreover, the data processing unit 120 may calculate similarity scores between each of the three patch images and the fourth patch image. Accordingly, the first similarity score between the first patch image and the fourth patch image, the second similarity score between the second patch image and the fourth patch image, the third similarity score between the third patch image and the fourth patch image may be calculated. Four patch images are determined to be aligned if the first similarity score, the second similarity score and the third similarity score are larger than a predetermined threshold value.

The training data may be generated by using the first to fourth patch images as one training data set. The training data set may be plural, and each may be generated through the plurality of low-quality training images and the one high-quality training image capturing different objects at different times.

Figure 3:
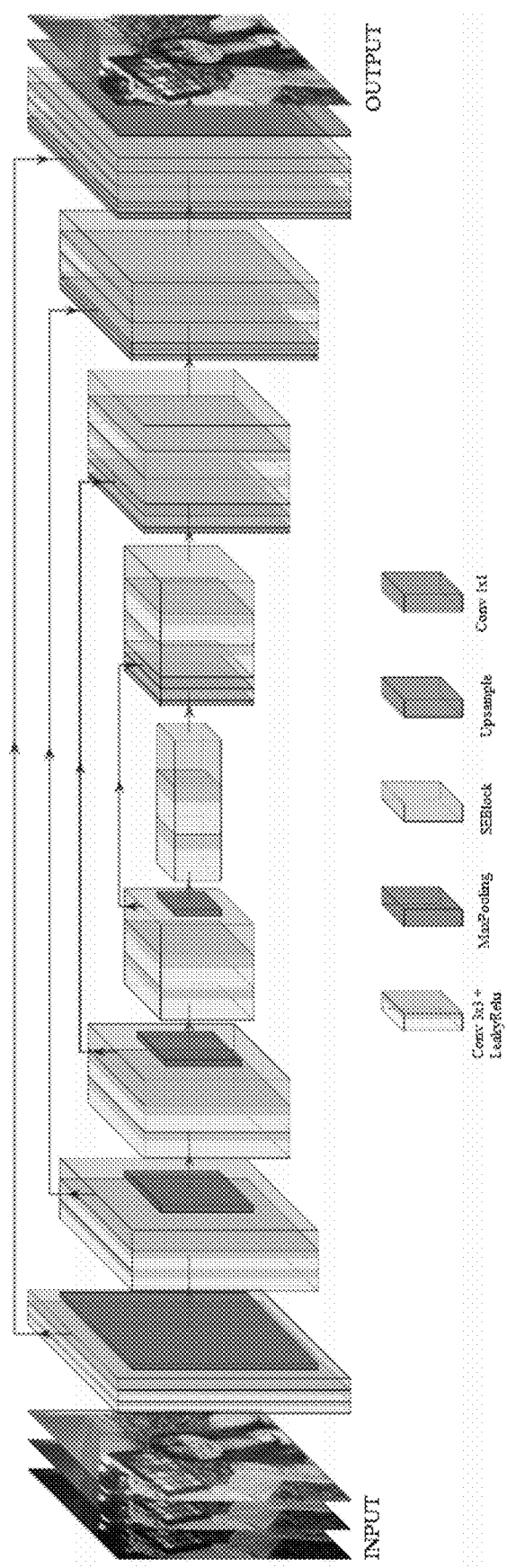
FIG. 3 is a view for explaining a CNN architecture according to an embodiment of the present invention.

FIG. 3 is a view for explaining a CNN architecture according to an embodiment of the present invention.

Referring to FIG. 3, the CNN architecture may be built based on a conventional U-NET, an image segmentation network according to Non Patent Literature 2 (which is incorporated by reference herein). The U-NET according to the invention that is modified from the conventional U-NET hereinafter referred to as the modified U-NET.

Similar to the conventional U-NET's structure, the modified U-NET may include a contraction path for down-sampling input data and an expansion path for up-sampling the down-sampled data.

The modified U-NET may be altered from the conventional U-NET by reducing the network size in terms of the number of feature maps to enable the modified network that could be inferred in smart phones with limited computing power.

In addition, the modified U-NET may be altered from the conventional U-NET by replacing ReLU layer by LeakyReLU layer. In general, in the case of the conventional U-NET, a ReLU layer is used as an activation function layer, but in the present invention, the LeakyReLU layer is used instead of the ReLU layer. This may improve the network's performance by reducing dead neurons compared to the ReLU layer and improving the gradient flow in the back-propagation process.

Moreover, the modified U-NET may be altered from the conventional U-NET by adding a SEBlock layer according to Non Patent Literature 3, which is incorporated by reference herein.

Accordingly, the contraction path includes a first layer combination in which a convolutional layer, a leaky ReLU layer, the SEBlock layer, and a pooling layer are sequentially arranged. The first layer combination may be plural, and the plurality of first layer combinations may be sequentially arranged. The present invention has the advantage of improving channel interdependency by arranging the SEBlock layer before the pooling layer. This may emphasize important channels while reducing the contribution of adverse channels.

Accordingly, the expansion path includes a second layer combination in which an up-sampling layer, a convolutional layer, a leaky ReLU layer, and the SEBlock layer are sequentially arranged. The second layer combination may be plural, and the plurality of second layer combinations may be sequentially arranged. The present invention has an advantage of improving channel interdependency by arranging the SEBlock layer before the up-sampling layer. This may emphasize important channels while reducing the contribution of adverse channels.

Figure 4:
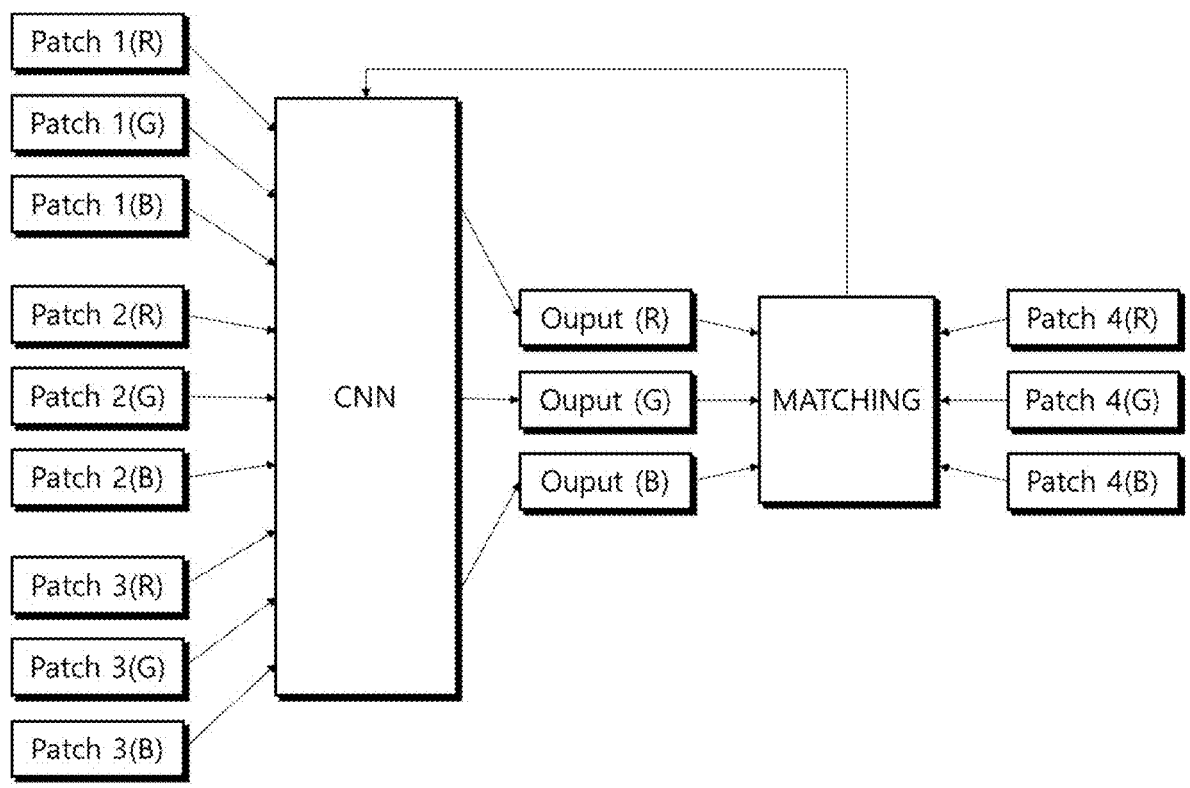
FIG. 4 is a view explaining a learning process of a CNN architecture according to an embodiment of the present invention.

FIG. 4 is a view explaining a learning process of a CNN architecture according to an embodiment of the present invention.

Referring to FIG. 4, the CNN architecture according to the embodiment of the present invention may include nine input channels of the respective three low-quality training images and three output channels.

The CNN architecture may receive information on RED color channels, GREEN color channels, and BLUE color channels of the respective three low-quality training images through the nine input channels. For example, referring to FIG. 4, the CNN architecture may receive information on the RED color channel (Patch 1(R)), the GREEN color channel (Patch 1(G)), and the BLUE color channel (Patch 1(B)) of the first low-quality training image, information on the RED color channel (Patch 2(R)), the GREEN color channel (Patch 2(G)) and the BLUE color channel (Patch 2(B)) of the second low-quality training image, and information on the RED color channel (Patch 3(R)), the GREEN color channel (Patch 3(G)), and the BLUE color channel (Patch 3(B)) of the third low-quality training image.

The CNN architecture may output information on the RED color channel (Output (R)), the GREEN color channel (Output (G)), and the BLUE color channel (Output (B)) through the three output channels.

The CNN architecture may match information on the RED color channels (Output (R)), the GREEN color channels (Output (G)), and the BLUE color channels (Output (B)) of the output channels to information on the RED color channel (Patch 4(R)), the GREEN color channel (Patch 2(G)), and the BLUE color channel (Patch 2(B)) of the high-quality training image, respectively. The CNN architecture may be updated using matching results.

Terms described in the specification such as "unit" refer to software or a hardware component such as graphics processing unit (GPU), a field-programmable gate array (FPGA) or an Application-Specific Integrated Circuit (ASIC), and the unit performs certain functions. However, the "unit" is not limited to software or hardware. The "unit" may be configured in a storage medium that may be addressed or may be configured to be executed by at least one processor. Therefore, examples of the "unit" include components such as software components, object-oriented software components, class components and task components, and processes, functions, attributes, procedures, subroutines, segments of program codes, drivers, firmware, micro codes, circuits, data, database, data structures, tables, arrays, and variables. Components and functions provided from "units" may be combined into a smaller number of components and "units" or may be further separated into additional components and "units." In addition, the components and the "units" may be implemented to playback one or more central processing units (CPUs) in a device or a secure multimedia card.

Various and advantageous effects of the present invention are not limited to the above description and will be more easily understood in describing specific embodiments of the present invention.

While the present invention has been described with reference to the embodiments, the embodiments are only exemplary embodiments of the present invention and do not limit the present invention, and those skilled in the art will appreciate that various modifications and applications, which are not exemplified in the above description, may be made without departing from the scope of the essential characteristic of the present exemplary embodiments. For example, each component described in detail in the embodiments can be modified. In addition, it should be understood that differences related to these modifications and applications are within the scope of the present invention as defined in the appended claims.

What is claimed is:

1. An image processing device comprising:
a convolutional neural network (CNN) architecture configured to perform at least one of denoising, deblurring, dehazing, and color correction on an input, wherein the input comprises a plurality of low-quality input images having different exposure values captured for the same object at the same time by a camera under display (CUD) to render a high-quality output image,
wherein the CNN architecture is trained using a set of training images including a plurality of low-quality training images having different exposure values and a high-quality training image corresponding to the plurality of low-quality training images,
wherein the plurality of low-quality training images and the high-quality training image are images capturing the same object at the same time,
wherein the plurality of low-quality training images are captured through a CUD to have different exposure values,
wherein the high-quality training image is captured through a front camera other than the CUD,
wherein the plurality of low-quality input images and the plurality of low-quality training images include three low-quality images having different exposure values,
wherein the CNN architecture includes nine input channels and three output channels,
wherein the CNN architecture receives information on RED color channels, GREEN color channels, and BLUE color channels of the respective three low-quality images through the nine input channels,
wherein the CNN architecture outputs information on the RED color channel, the GREEN color channel, and the BLUE color channel through the three output channels,
wherein the CNN architecture learns by matching the information on the RED color channel, the GREEN color channel, and the BLUE color channel of the output channels to information on the RED color channel, the GREEN color channel, and the BLUE color channel of the high-quality training image, respectively,
wherein the CNN architecture is trained using training data, wherein the training data comprises three patch images generated for the three low-quality training images by estimating overlapped regions of interest that overlap between each of the three low-quality training images and the warped high-quality training image, and a fourth patch image that is best aligned to the three patch images on the regions of interest of the warped high-quality training image, and
wherein the warped high-quality training image is formed by applying a warping transform on the high-quality training image using a homography matrix, and
wherein the homography matrix is estimated using the three low-quality training images and the high-quality training image.

2. The image processing device according to claim 1, wherein the four patch images are determined to be aligned if the first similarity score between the first patch image and the fourth patch image, the second similarity score between the second patch image and the fourth patch image, and the third similarity score between the third patch image and the fourth patch image are larger than a predetermined threshold value.

3. The image processing device according to claim 2, wherein the CNN architecture is a modified U-NET, wherein the modified U-NET includes a contraction path for down-sampling input data, and an expansion path for up-sampling the down-sampled data, and
wherein the modified U-NET size is reduced by reducing the number of feature maps, the modified U-NET is further provided with a LeakyReLU layer in replacement of ReLU layer, and a SEBlock layer is added to the modified U-NET.

4. The image processing device according to claim 3, wherein the contraction path includes a first layer combination in which a convolutional layer, a leaky ReLU layer, a SEBlock layer, and a pooling layer are sequentially arranged.

5. The image processing device according to claim 3, wherein the expansion path includes a second layer combination in which an up-sampling layer, a convolutional layer, a leaky ReLU layer, and a SEBlock layer are sequentially arranged.

6. The image processing device according to claim 1, wherein the CNN architecture further includes a conversion unit for converting a YUV color format of the low-quality images to a RGB color format or converting the RGB color format of the output image to the YUV color format.

7. The image processing device according to claim 1, further comprising:
an image enhancer,
wherein the image enhancer is configured to extract human area in the high-quality training image and apply color adjustment to the extracted human area to enhance the quality of high-quality training image.

* * * * *